(12) United States Patent
Sakamoto

(10) Patent No.: US 9,567,727 B2
(45) Date of Patent: Feb. 14, 2017

(54) SEABED RESOURCE LIFTING DEVICE

(71) Applicant: Submarine Resources Development Co., Ltd., Ibaraki (JP)

(72) Inventor: Shoichi Sakamoto, Ibaraki (JP)

(73) Assignee: SUBMARINE RESOURCES DEVELOPMENT CO., LTD., Ibaraki (JP)

( * ) Notice: Subject to any disclaimer, the term of this patent is extended or adjusted under 35 U.S.C. 154(b) by 0 days.

(21) Appl. No.: 14/777,729

(22) PCT Filed: Mar. 24, 2014

(86) PCT No.: PCT/JP2014/058141
§ 371 (c)(1),
(2) Date: Sep. 16, 2015

(87) PCT Pub. No.: WO2014/157118
PCT Pub. Date: Oct. 2, 2014

(65) Prior Publication Data
US 2016/0289917 A1    Oct. 6, 2016

(30) Foreign Application Priority Data
Mar. 28, 2013  (JP) ................ 2013-069042

(51) Int. Cl.
*E02F 3/88*    (2006.01)
*E02F 5/00*    (2006.01)
(Continued)

(52) U.S. Cl.
CPC ............ *E02F 3/8858* (2013.01); *E02F 5/006* (2013.01); *E02F 7/005* (2013.01); *E02F 7/10* (2013.01)

(58) Field of Classification Search
CPC ...... E02F 3/8858; E02F 3/9206; E02F 3/9243; E02F 3/9268; E02F 5/006
(Continued)

(56) References Cited

U.S. PATENT DOCUMENTS 3,513,081 A * 5/1970 Wanzenberg ......... E02F 3/8858
                                                            204/278
4,084,375 A * 4/1978 Horvath .................. F03B 17/02
                                                            60/496
(Continued)

FOREIGN PATENT DOCUMENTS

JP    S55-119888 A    9/1980
JP    2009-174509 A   8/2009
(Continued)

*Primary Examiner* — Gary Hartmann
(74) *Attorney, Agent, or Firm* — Greer, Burns & Crain, Ltd.

(57) ABSTRACT

A seabed-resource lifting device causing deep-sea mud that contains rare-earth elements to rise from depths of 5000 m or more. This seabed-resource lifting device includes: a transport hose that includes a first hose and a second hose and that hangs from a resource-recovery vessel to the seabed; a crawler-type collector that includes a first suction chamber that sends mud from the seabed to the first hose, and a second suction chamber that sends mud from the seabed to the second hose; a water electrolyzer that, using electricity supplied from the resource-recovery vessel, electrolyzes water so as to generate hydrogen gas and oxygen gas; and a gas-injection device that injects the generated hydrogen gas and oxygen gas into the first suction chamber and the second suction chamber, respectively. Mud that contains rare-earth elements rises with sea water due to the buoyancy of the hydrogen gas or oxygen gas.

6 Claims, 5 Drawing Sheets

(51) Int. Cl.
  *E02F 7/00* (2006.01)
  *E02F 7/10* (2006.01)
(58) Field of Classification Search
  USPC .................. 37/313, 317, 321, 323, 335, 344
  See application file for complete search history.

(56) References Cited

U.S. PATENT DOCUMENTS

| | | | | |
|---|---|---|---|---|
| 4,384,459 A | * | 5/1983 | Johnston | .................. F03G 7/05 |
| | | | | 165/45 |
| 4,435,355 A | * | 3/1984 | Weinert | .................. G21C 1/00 |
| | | | | 376/208 |
| 5,553,976 A | * | 9/1996 | Korsgaard | .............. E21B 17/22 |
| | | | | 138/113 |
| 2014/0169989 A1 | * | 6/2014 | Nakamura | ............ E02F 3/8833 |
| | | | | 417/54 |

FOREIGN PATENT DOCUMENTS

| | | |
|---|---|---|
| JP | 2010-180528 A | 8/2010 |
| JP | 2011-196047 A | 10/2011 |

\* cited by examiner (A)  (B)

Cross-section taken along the Line A – A

SEABED RESOURCE LIFTING DEVICE

BACKGROUND

The present invention relates to a seabed-resource lifting device, and more particularly relates to a seabed-resource lifting device capable of causing rare-earth elements to rise from a seabed having a depth of 5000 meters or more.

Because the deep sea at a depth of 5000 meters or more is under high pressure of as much as about 500 atmospheres (500 kgf/cm$^2$), i.e., 50 MPa, and the total weight of a riser pipe extending to the seabed becomes large, it is not possible to mine rare-earth elements in the deep sea on a commercial basis by using conventional techniques, which at most allow mud samples to be picked from the seabed by using a sampling device attached to the end of a wire.

Patent Document 1 discloses ore-lifting equipment that is capable of lifting ore from the seabed. This ore-lifting equipment includes (1) an ore-transport pipe through which seawater containing ore is transported to an offshore platform, (2) a circulation-transport pipe through which seawater is returned to the seabed from the offshore platform, (3) a circulation pump that sends seawater to the circulation-transport pipe, (4) a submersible pump that sucks in seawater containing ore from a suction port on the seabed and sends it to the ore-transport pipe, and (5) a water turbine that drives the submersible pump by using as a power source seawater flowing through the circulation transport pipe. Document 1 states that this ore-lifting equipment can be used at depths of 500 meters-2000 meters. However, ore-lifting equipment that can be used at a depth of 5000 meters or more has not been realized, because in order to collect mud-containing ore from the seabed at such a depth, the equipment requires both a long heavy pipe that is hung from an offshore platform and a strong pump that is capable of pumping seawater from the seabed up to a platform that is 5000 or more meters above.

PRIOR ART DOCUMENT

Patent Document

[Patent Document 1] JP-A-2011-196047

SUMMARY

The present invention is intended to solve the aforesaid problems, and the objective of the present invention is to provide a seabed-resource lifting device that is capable of causing mud containing rare-earth elements to rise from the deep seabed at a depth of 5000 meters or more.

The seabed-resource lifting device according to the present invention includes a transport hose that consists of (1) a first hose and a second hose, hung from a resource-recovery vessel to the seabed; (2) a crawler-type collector that includes (a) a first suction chamber that moves mud from the seabed to the first hose, (b) a second suction chamber that moves mud from the seabed to the second hose; (3) a water electrolyzer that electrolyzes water so as to generate hydrogen gas and oxygen gas by using electric power supplied from the resource-recovery vessel; and (4) a gas-injection device that injects the hydrogen gas and the oxygen gas that have been generated into the first suction chamber and the second suction chamber, respectively; and wherein the buoyancy of the hydrogen gas and the oxygen gas causes the mud that contains rare-earth elements to rise together with the seawater.

The transport hose includes, on its inner wall, annular ribs in the axial direction of the hose.

The transport hose is made of soft vinyl chloride that has insulating capability, and conductive wire is embedded inside the hose.

The resource-recovery vessel recovers hydrogen gas and oxygen gas from the transport hose, and the hydrogen gas and the oxygen gas react with each other to generate electricity, which is used as part of the electric power supplied to the water electrolyzer.

The transport hose includes a bubble-breaking device that includes rotor blades that are driven by the flow of rising seawater and that rotate in directions opposite to each other.

The transport hose includes a seawater-intake device that has an inner pipe and an outer pipe, with the velocity of flow of seawater inside the inner pipe increased so as to reduce the pressure in the inner pipe, thereby drawing the outside seawater through the space between the inner pipe and the outer pipe.

The seabed-resource lifting device of the present invention operates as follows: there is placed on the seabed a water electrolyzer by which water is electrolyzed by using electric power supplied from a resource-recovery vessel so as to generate hydrogen gas and oxygen gas; the hydrogen gas and the oxygen gas that are generated are sent to a first suction chamber and a second suction chamber, respectively, which are provided to a crawler-type collector, and mud on the seabed is collected by those suction chambers; the collected mud rises through the first hose and the second hose by using the buoyancy of the hydrogen gas and the oxygen gas. Accordingly, the device provided by the invention is capable of causing mud that contains rare-earth elements to rise together with the seawater, whereby the rare-earth elements are collected.

Annular ribs are provided to the inner wall of the transport hose in the axial direction of the hose, with the spacing between adjacent ribs being held constant so that the ribs can serve to resist the hydrogen gas and the oxygen gas that rise in the hose, thereby causing the transport hose to rise toward the sea surface as if the total weight of the transport hose had been reduced.

The transport hose is made of soft vinyl chloride that has insulating capability, and conductive wire is embedded inside the hose, thereby improving the strength of the hose. In addition, by using this conductive wire, electric power is supplied from the resource-recovery vessel on the surface of the sea to the water electrolyzer that has been placed on the seabed. The wire that is embedded in the first hose can be used to send electric power from the resource-recovery vessel to the water electrolyzer, and the wire embedded in the second hose can be used to return electric power from the water electrolyzer to the resource-recovery vessel.

Hydrogen gas and oxygen gas are recovered from the transport hose, so that the hydrogen gas and the oxygen gas react with each other to generate electricity, which in turn is used as part of the electric power supplied to the water electrolyzer.

A bubble-breaking device is provided to the transport hose so that large bubbles rising in the transport hose can be broken. As the size of the bubbles become smaller, the buoyancy of the bubbles become smaller, and therefore the velocity of the rise of seawater containing bubbles and mud can be restricted.

A seawater-intake device is provided to the transport hose, so that seawater outside of the hose can be drawn into the transport hose. Even if the bubbles expand as they rise in the hose, the ratio of the volume of bubbles to the volume of seawater in the hose is maintained almost constant by increasing the volume of the seawater in the hose, thereby preventing an increase in the ratio of the volume of bubbles in the transport hose.

DETAILED DESCRIPTION

Figure 1:
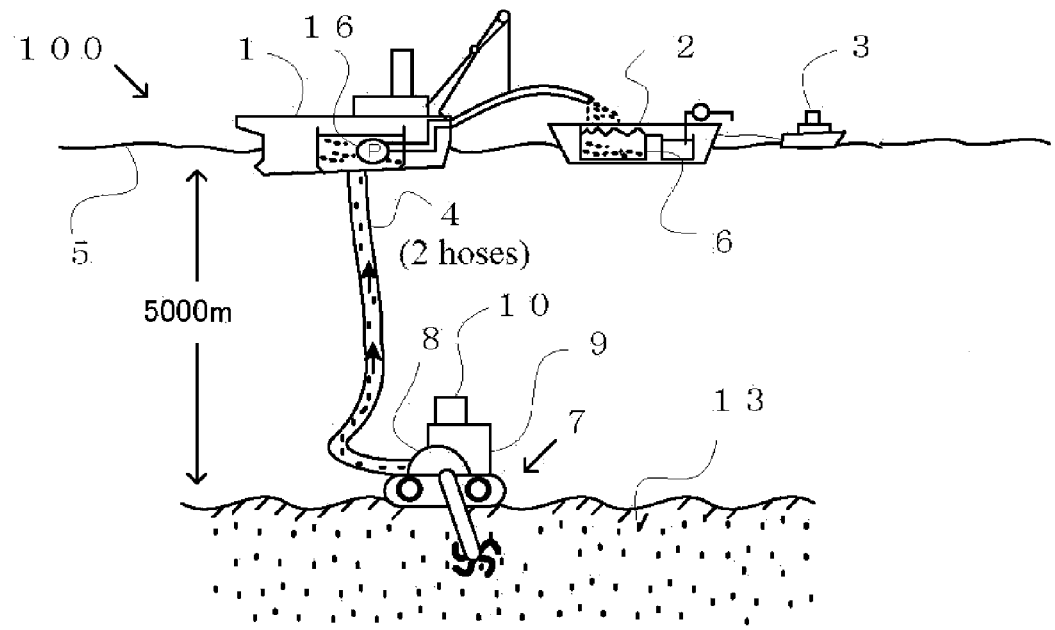
FIG. 1 is a schematic diagram of a seabed-resource lifting device according to the present invention. (Example 1)

The seabed-resource lifting device according to the present invention will now be explained in detail, referring to the drawings attached hereto.

EXAMPLES

FIG. 1 is a schematic diagram of a seabed-resource lifting device 100 according to the present invention. The device 100 includes a resource-recovery vessel 1, a barge 2, and a tugboat 3—all provided on the surface of the sea. The tugboat 3 tows the barge 2. The barge 2 is loaded with a separator 6 that separates mud from seawater containing the mud. The supernatant in a separation tank of the separator 6 is returned to the sea. The seabed-resource lifting device 100 also includes a transport hose 4 that consists of a first hose 4a and a second hose 4b, the transport hose 4 being hung from the resource-recovery vessel 1 and reaching the seabed, and a self-propelled crawler-type collector 7 that is coupled to the end of the transport hose 4 and that collects mud 13 on the seabed to send it to a suction chamber 8. The crawler-type collector 7 includes a water electrolyzer 9 that electrolyzes water so as to generate hydrogen and oxygen, and a gas-injection device 10 that injects the generated hydrogen gas and oxygen gas into a suction chamber 8. The gas-injection device 10 includes a high-pressure pump 23, and a nozzle 22 that injects hydrogen gas or oxygen gas. The suction chamber 8 of the crawler-type collector 7, which is connected to the transport hose 4, is where seabed resources being collected are gathered and from where the gathered resources are sent to the transport hose 4.

Figure 2:
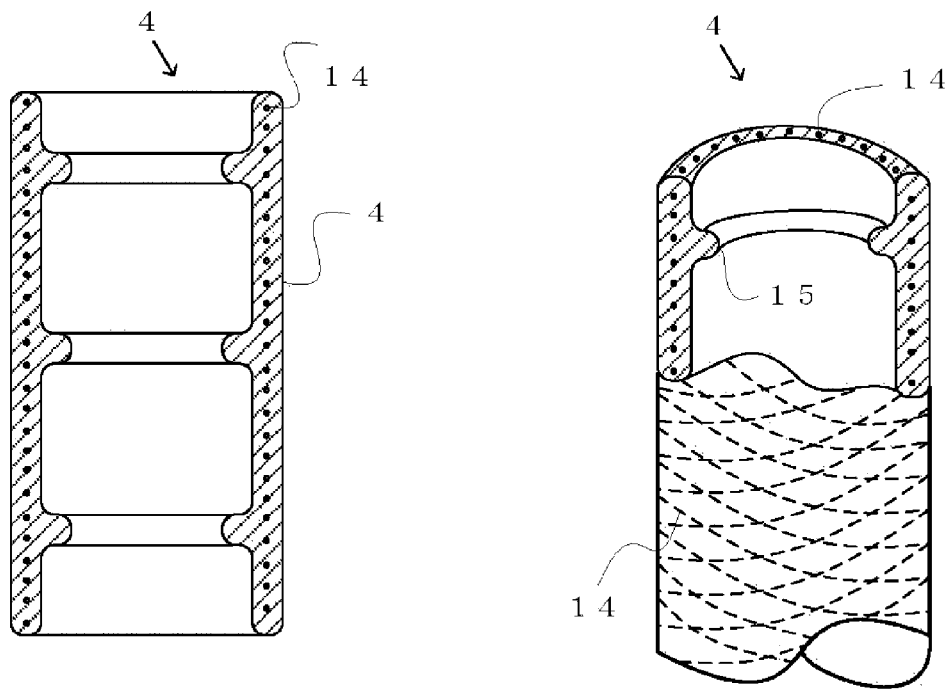
FIG. 2 consists of two sectional views of the transport hose of FIG. 1.

FIG. 2 is a sectional view of the transport hose 4 of FIG. 1. As is shown in FIG. 2(A), the transport hose 4 includes annular ribs 15 in the axial direction on the inner wall of the hose 4, the spacing between the adjacent ribs being constant. As is shown in FIG. 2(B), the transport hose 4 is made of soft vinyl chloride that has insulating capability, and a conductive wire 14 is embedded in a mesh shape inside the hose 4. Because the conductive wire 14 is embedded in the hose 4, the device 100 can supply electricity to the crawler-type collector 7, the water electrolyzer 9, and the gas-injection device 10—all of which are on the seabed. For example, if electricity is supplied by two direct electric-supply lines, two transport hoses 4 are used. Because the transport hose 4 is made of soft vinyl chloride, it might get bent due to deep-sea pressure when it is submerged in the sea, and accordingly the inside of the transport hose 4 must always be filled with seawater when it is submerged in the sea. Thus, the pressure between the inside and the outside of the transport hose 4 is balanced, so as to prevent deformation of the transport hose 4. The outside diameter of the transport hose 4 is 10 cm-20 cm, but it is not limited to that size.

Figure 3:
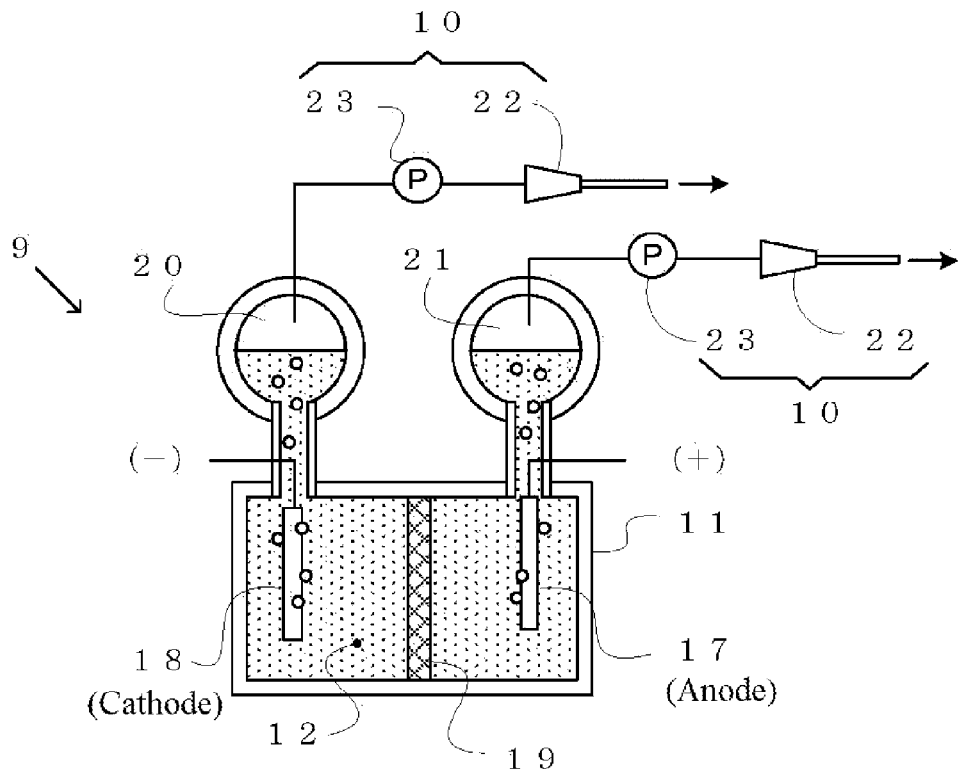
FIG. 3 is a diagram showing the water electrolyzer of FIG. 1.

FIG. 3 is a diagram showing the water electrolyzer 9 of FIG. 1. The water electrolyzer 9 electrolyzes water in an electrolytic bath 11 so as to generate hydrogen and oxygen in a ratio of 2:1. The water in the electrolytic bath 11 is made into an electrolytic solution 12 by adding to the water an electrolyte that includes sodium hydroxide or caustic potash, so as to facilitate the water's electrical conductivity. The electrolytic bath 11 is partitioned by a separating membrane 19, through which ions can pass, into two compartments so as to enclose the electrolytic solution 12 in those compartments. An anode 17 is provided to one compartment, and a cathode 18 is provided to the other compartment, so that water is electrolyzed. On the surface of the cathode 18, an electron (e⁻) reacts with water ($H_2O$) to generate hydrogen ($H_2$). The reaction formula is shown below.

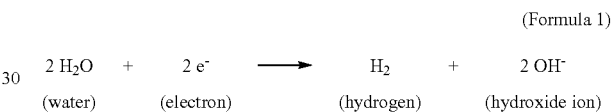

(Formula 1)

The hydroxide ion (OH⁻) that is generated at the cathode 18 moves to the anode 17, and loses the electron at the anode 17 so as to generate oxygen ($O_2$). The reaction formula is shown below.

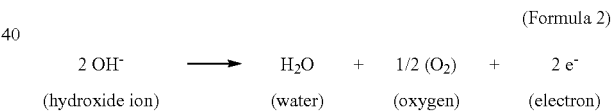

(Formula 2)

As electrolyzation of the water progresses, water is decomposed into hydrogen gas 20 and oxygen gas 21, which causes the amount of the electrolytic solution 12 to decrease. The electrolyte remains in the electrolytic solution 12 without being reduced, and therefore it is not necessary to supply an electrolyte, and it is necessary only to supply water to the electrolytic bath 11. Water can be supplied from the resource-recovery vessel through a variety of devices, including pipes. Also, fresh water that is produced by running seawater through a reverse-osmosis membrane on the seabed can be used as the water supply. The hydrogen gas 20 and oxygen gas 21 that are generated are injected into the first suction chamber 8a and second suction chamber 8b, respectively, by the gas-injection device 10.

Figure 4:
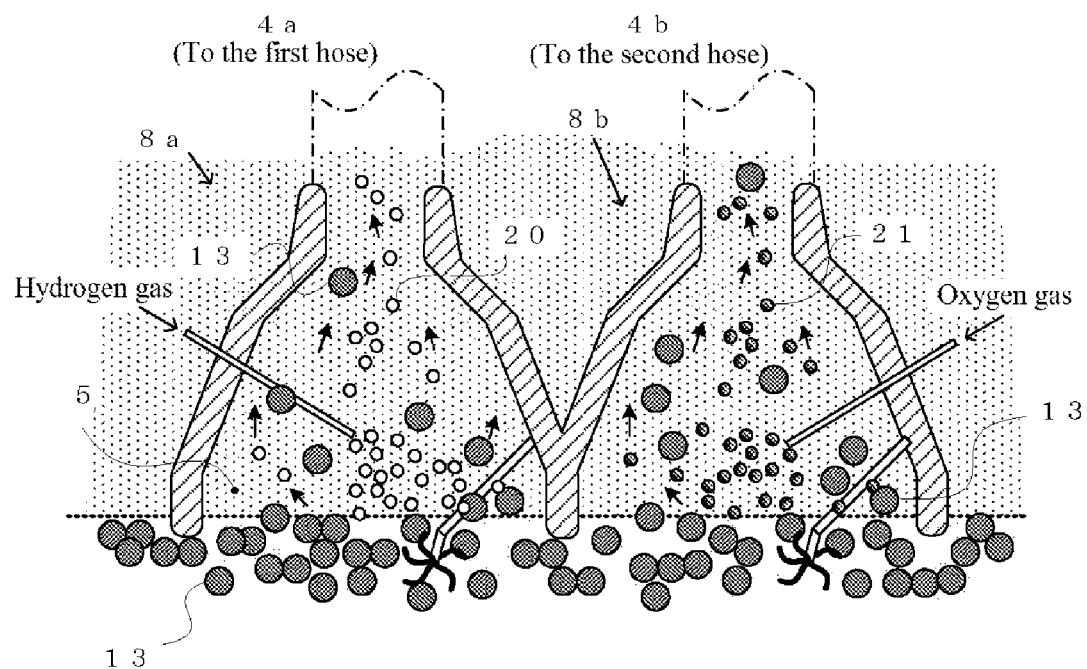
FIG. 4 is a two-part diagram that shows the inside of a crawler-type collector.

FIG. 4 is a diagram that shows the inside of the crawler-type collector 7. The suction chamber 8 consists of a first suction chamber 8a and a second suction chamber 8b. When the collector 7 operates on the seabed at a depth of 5000 meters, the pressure of the hydrogen gas 20 and oxygen gas 21 that are generated by the water electrolyzer 9 is raised to 500 atmospheres or above by the high-pressure pump 23 in order that those gases can be injected into the suction chamber 8. Even if the hydrogen gas 20 and the oxygen gas 21 are subjected to water pressure of 500 atmospheres at a water temperature of 1.5° C., the hydrogen gas 20 and oxygen gas 21 remain in a gaseous state and are not liquefied. Thus, the gases become bubbles that rise to the surface inside the transport hose 4 that is formed of the first hose 4a and the second hose 4b. The rise of the bubbles induces the seawater 5 that contains the mud 13 to rise. The suction chamber 8 consists of two chambers—the first suction chamber 8a and the second suction chamber 8b—so that the hydrogen gas 20 and the oxygen gas 21 can be separately injected into their respective separate chambers. Even if the two types of gas are injected in a mixed state, the mixed gas will not burn unless it is ignited at a temperature of about 570° C. However, the two chambers are provided to the suction chamber 8 so that the hydrogen gas 20 does not burn in the presence of the oxygen gas 21 due to some rare accident.

The hydrogen gas 20 and the oxygen gas 21 that are generated by electrolyzing one liter of water become 1860 liters of gas under pressure of 1 atmosphere. The gas is compressed to 1/500 of that volume on the seabed at a depth of 5000 meters, i.e., to 3.72 liters (1860 liters divided by 500). However, as the gas rises up from the seabed to the surface of the sea, the water pressure on the gas decreases. This causes the compressed gas to gradually recover its original volume, which increases the buoyant force of the gas.

The bubbles of the hydrogen gas 20 and the oxygen gas 21 on the seabed at a depth of 5000 meters expand by 500 times on the surface of the sea. If the radius of a bubble on the seabed is denoted by r1, and if the radius of a bubble on the surface of the sea is denoted by r2, the volume of a bubble on the seabed, denoted as V1, is expressed as $(4/3)\pi(r1)^3$, and the volume of a bubble on the surface of the sea, denoted as V2, is expressed as $(4/3)\pi(r2)^3$. Accordingly, V2/V1 results in $(r2)^3/(r1)^3$. If V2/V1 is 500, then $(r2)^3/(r1)^3=500$, which gives a relationship of $r2\approx8r1$. Therefore, if the radius of a bubble on the seabed (r1) is 1 mm, the radius of the bubble on the surface of the sea (r2) will be 8 mm. If the radius of the bubble on the seabed (r1) is 6 mm, the radius of the bubble on the surface of the sea (r2) will be 48 mm (=a diameter of 96 mm). In order that a constant ratio between the bubbles and the seawater containing mud is maintained in the transport hose 4, the diameter of the transport hose 4 can be gradually expanded from the seabed to the surface of the sea. Also, it is desirable that the bubbles injected from the nozzles 22 into the suction chambers 8a and 8b on the seabed maintain suitable sizes.

The bubbles receive buoyancy F, as calculated by $F=\rho gV$. The $\rho$ represents the density of water, which is 1000 kg/m$^3$; g represents the acceleration of gravity, which is 9.8 m/s$^2$; and V represents the volume of a bubble (m$^3$). If the radius of a bubble is denoted by r, then $V=(4/3)\pi r^3$. If $V=(4/3)\pi r^3$ is substituted into $F=\rho gV$, the buoyancy F is expressed as $F=(4/3)\rho g\pi r^3$. For example, a bubble having a radius of 8 mm has buoyancy of $F1=2.1\times10^{-2}$ (kg·m/s$^2$), and a bubble having a radius of 48 mm has buoyancy of $F2=4.62$ (kg·m/s$^2$). As is shown above, the buoyancy of a larger bubble is larger than that of a smaller bubble.

Because the buoyancy F of a bubble is balanced by the drag R of the bubble, the velocity at which the bubble rises is calculated using the formula $F=R$. The drag R is expressed by $R=(1/2)\times Cd\times\rho U^2S$, where Cd is the drag coefficient. S represents the projected area of a bubble, being expressed as $\pi r^2$; $\rho$ represents the density of water, which is 1000 kg/m$^3$; and U represents the velocity (m/s) at which a bubble rises. Because the drag R is balanced by the above-mentioned buoyancy F, $F=R$ is expressed as $(4/3)\rho g\pi r^3=(1/2)\times Cd\times\rho U^2\times(\pi r^2)$. This equation can be rewritten as $U^2=(8/3)\times(gr/Cd)$. It is known that the drag coefficient (Cd) of water (Cd) is between 1 and 2. If Cd is 2, and if g is 9.8 m/s$^2$, and if the radius r is $8\times10^{-3}$ m (=8 mm), and these values are substituted into $U^2=(8/3)\times(gr/Cd)$, then $U\approx0.32$ m/s is obtained. Thus, the velocity at which a bubble having a radius of 8 mm rises is about 32 cm/s. Also, a bubble having a radius of 80 mm rises at about 1 m/s. As is shown above, the velocity at which a larger bubble rises is larger than that of a smaller bubble. If Cd is 1, then the velocity at which a bubble having a radius of 8 mm rises is about 45 cm/s, and the velocity at which a bubble having a radius of 80 mm rises is about 1.45 m/s.

Figure 5:
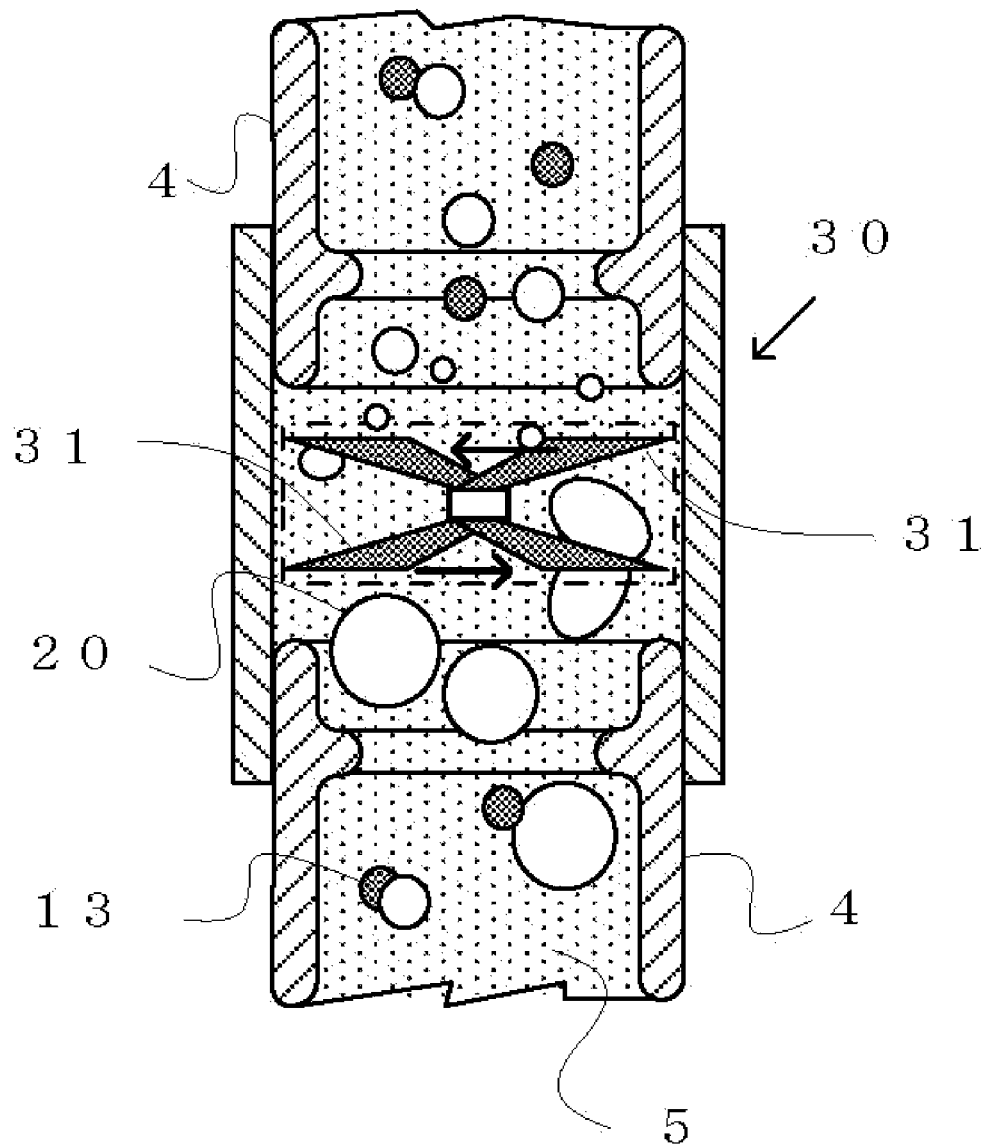
FIG. 5 is a diagram of a bubble-breaking device that is attached to a transport hose.

FIG. 5 is a diagram of a bubble-breaking device 30 that is attached to the transport hose 4. The bubble-breaking device 30 includes rotor blades 31, 31 that rotate in directions opposite to each other against the flow of the water. The rotor blades 31, 31 are driven by seawater containing mud and bubbles that rise in the hose 4. As is shown in FIG. 5, the bubbles of the hydrogen gas 20 that have increased in size are sandwiched between the rotor blades 31, 31 to be broken into smaller bubbles. The bubbles can stay on the ribs 15 of the inner wall of the transport hose 4, and can combine with the bubbles that rise following the bubbles that stay on the ribs 15, to form larger bubbles. Also, the larger a bubble is, the larger its buoyancy is, and therefore larger bubbles rise faster than smaller bubbles. Accordingly, larger bubbles might collide with smaller bubbles, rising more slowly than the larger bubbles that don't collide, and combining with the smaller bubbles to form even larger bubbles. The bubble-breaking device 30 breaks the large bubbles into smaller ones so as to prevent the bubbles from capturing the majority of the space inside the transport hose 4. As mentioned above, the velocity at which a small bubble rises is less than that of a large bubble. Accordingly, making bubbles smaller decreases the velocity at which the bubble rise, and also decreases the velocity at which the seawater that contains the bubbles rises. Also, even if the bubbles are broken and made smaller, the ratio of the volume of the bubbles to the volume of the seawater inside the transport hose 4 of a given length is not changed.

Figure 6:
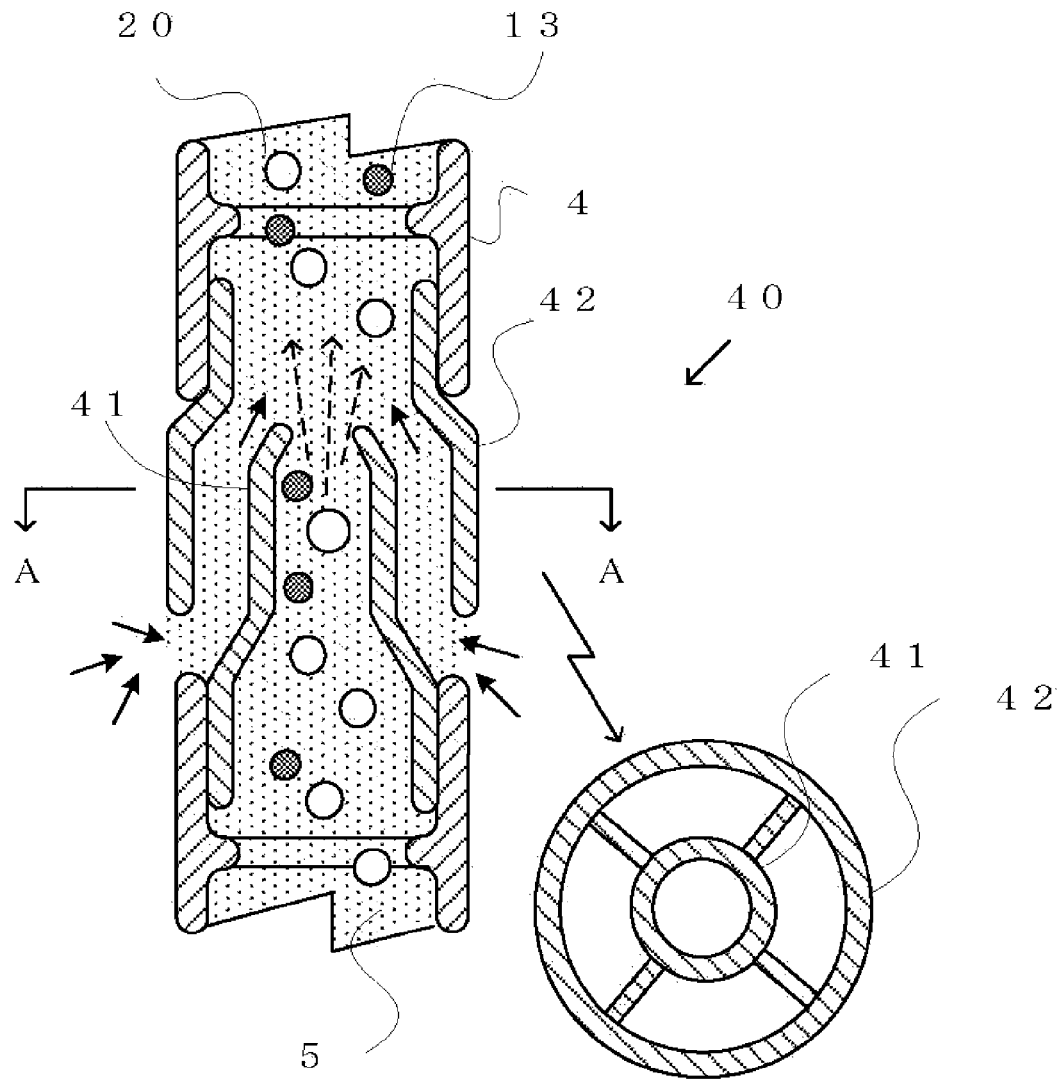
FIG. 6 is a diagram of a seawater-intake device attached to the transport hose.

FIG. 6 is a diagram of a seawater-intake device 40 that is attached to the transport hose 4. The seawater-intake device 40 includes an inner pipe 41 and an outer pipe 42, with the outside seawater being drawn into the hose 4 through the space between the inner pipe 41 and the outer pipe 42. The diameter of the upper part of the inner pipe 41 is reduced, whereby the velocity of the mud and the seawater containing bubbles increases, which lowers the pressure inside the transport hose 4, which in turn facilitates the drawing of seawater into the hose 4. If the amount of bubbles in the hose 4 is not sufficient, it is not possible to drive the seawater flow containing mud. However, if the volume of the bubbles supplied into the hose 4 is increased, the bubbles increase the velocity of the seawater as they rise in the hose 4 and their size increases. Accordingly, the seawater-intake device 40 is provided to the transport hose 4, and the intake device 40 draws seawater into the hose 40, which allows the ratio of the volume of bubbles to the volume of seawater to remain nearly constant, even if the volume of the bubbles increases. Therefore, the seawater-intake device 40 is helpful in controlling the speed of flow of the seawater. In addition, in FIG. 6, the outside diameter of the transport hose 4 at the upper part of the seawater-intake device 40, and the outside diameter of the transport hose 4 at the lower part of the seawater-intake device 40, have almost the same size.

However, the outside diameter of the transport hose 4 at the upper part of the seawater-intake device 40 can be set larger than that of the transport hose 4 at the lower part of the seawater-intake device 40.

Figure 7:
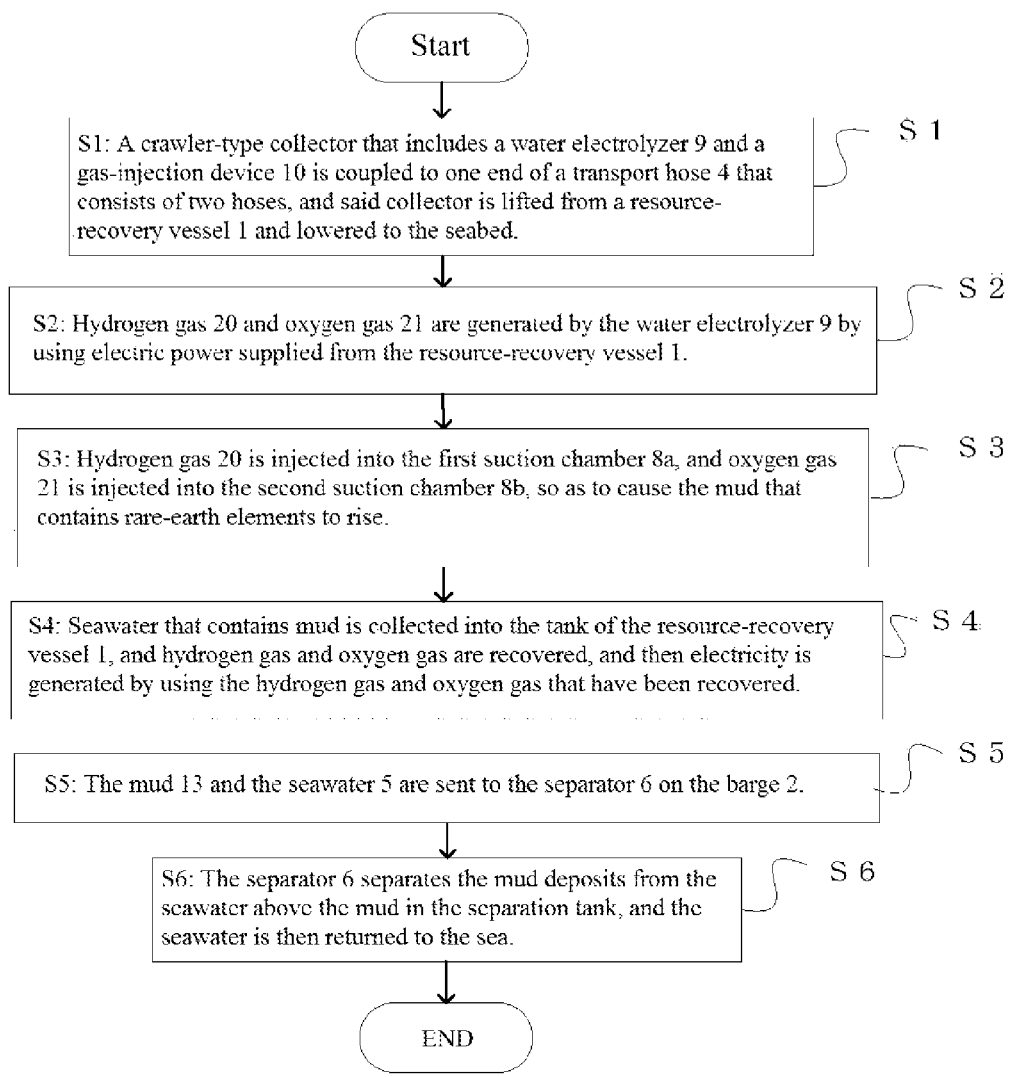
FIG. 7 is a flow diagram that shows the operations of the seabed-resource lifting device according to the present invention.

FIG. 7 is a flow diagram that shows the operations of the seabed-resource lifting device 100 according to the present invention. S1 is the operation by which the crawler-type collector 7, on which the water electrolyzer 9 and the gas-injection device 10 are mounted, is coupled to one end of the transport hose 4, which consists of two hoses, and by which the crawler-type collector 7 is lifted and then lowered from the resource-recovery vessel 1. S2 is the operation by which hydrogen gas 20 and oxygen gas 21 are generated by the water electrolyzer 9. Electric power is supplied from the resource-recovery vessel 1 to the water electrolyzer 9 through two transport hoses 4a, 4b. S3 is the operation by which the pressure of the hydrogen gas 20 and the oxygen gas 21 is increased by the high-pressure pump 23 so that the pressure of the gasses becomes higher than the water pressure on the seabed, and the gas-injection device 10 injects the hydrogen gas 20 and the oxygen gas 21 into the first suction chamber 8a and the second suction chamber 8b, respectively. S4 is the operation by which seawater 5 and mud 13 that contains rare-earth elements are collected and transferred to the resource-recovery vessel 1, and by which hydrogen gas 20 and oxygen gas 21 are recovered, reacting with each other to generate electricity. The electric power thereby generated can be used as part of the power to be supplied to the water electrolyzer 9. S5 is the operation by which the transport pump 16 pumps—to the separator 6 on the barge 2—mud 13 and seawater 5 that have been collected in the tank of the resource-recovery vessel 1. S6 is the operation by which mud 13 is separated from seawater 5 in the separation tank of the separator 6.

INDUSTRIAL APPLICABILITY

The present invention is suitable for a seabed-resource lifting device that is capable of collecting, from the seabed, mud that contains rare-earth elements.

LIST OF REFERENCE SIGNS

1 resource-recovery vessel
2 barge
3 tugboat
4 transport hose
4a first hose
4b second hose
5 seawater
6 separator
7 crawler-type collector
8 suction chamber
8a first suction chamber
8b second suction chamber
9 water electrolyzer
10 gas-injection device
11 electrolytic bath
12 electrolytic solution
13 mud
14 wire
15 rib
16 transport pump
17 anode
18 cathode
19 separating membrane
20 hydrogen gas
21 oxygen gas
22 nozzle
23 high-pressure pump
30 bubble-breaking device
31 rotor blade
40 seawater-intake device
41 inner pipe
42 outer pipe
100 seabed resource lifting device

The invention claimed is:

1. A seabed-resource lifting device comprising:
   a transport hose that consists of a first hose and a second hose and that is hung from a resource-recovery vessel to the seabed;
   a crawler-type collector that includes a first suction chamber that sends mud on the seabed to the first hose, and a second suction chamber that sends mud on the seabed to the second hose;
   a water electrolyzer that, by using electric power supplied from the resource-recovery vessel, electrolyzes water so as to generate hydrogen gas and oxygen gas; and
   a gas-injection device that injects, into the first suction chamber and the second suction chamber, respectively, the hydrogen gas and the oxygen gas that have been generated, whereby the buoyancy of the hydrogen gas and the oxygen gas causes the mud that contains rare-earth elements to rise together with the seawater.

2. The seabed-resource lifting device according to claim 1, wherein the transport hose includes annular ribs in the axial direction on the inner wall of said hose.

3. The seabed-resource lifting device according to claim 1, wherein the transport hose is made of soft vinyl chloride having insulating capability, and a conductive wire is embedded inside said hose.

4. The seabed-resource lifting device according to claim 1, wherein the resource-recovery vessel recovers hydrogen gas and oxygen gas from the transport hose, and the hydrogen gas and the oxygen gas react with each other to generate electricity that is used as part of the electric power supplied to the water electrolyzer.

5. The seabed-resource lifting device according to claim 1, wherein the transport hose includes a bubble-breaking device provided with rotor blades that rotate in the directions opposite to each other and that are driven by the flow of rising seawater.

6. The seabed-resource lifting device according to claim 1, wherein the transport hose includes a seawater-intake device that includes an inner pipe and an outer pipe, with the flow velocity inside the inner pipe being increased to reduce the pressure within said inner pipe, thereby drawing the outside seawater through the space between the inner pipe and the outer pipe.

* * * * *